United States Patent [19]

Münnich et al.

[11] 4,167,845
[45] Sep. 18, 1979

[54] AXIAL GUIDE FOR THE SHAFT OF A SPINNING ROTOR

[75] Inventors: Hermann Münnich, Bad Kissingen; Hermann Glöckner, Schweinfurt, both of Fed. Rep. of Germany

[73] Assignee: SKF Kugellagerfabriken GmbH, Schweinfurt, Fed. Rep. of Germany

[21] Appl. No.: 884,191

[22] Filed: Mar. 7, 1978

[30] Foreign Application Priority Data

Mar. 16, 1977 [DE] Fed. Rep. of Germany ... 7708087[U]

[51] Int. Cl.$^2$ .................. D01H 1/12; D01H 1/24; D01H 7/04
[52] U.S. Cl. .................. 57/104; 57/92; 57/58.89
[58] Field of Search .............. 57/58.89–58.95, 57/129, 170, 134, 135, 103–105; 308/149, 150, 152, 156, 178, 189 R, 214, 203, 228, 236

[56] References Cited

U.S. PATENT DOCUMENTS

| | | | |
|---|---|---|---|
| 929,851 | 8/1909 | Hess | 308/236 |
| 2,230,912 | 2/1941 | Sanders | 308/236 X |
| 3,316,038 | 4/1967 | Vigh | 308/203 |
| 3,482,386 | 12/1969 | Franzen | 308/152 X |
| 3,595,002 | 7/1971 | Korityssky et al. | 57/58.89 |
| 3,709,575 | 1/1973 | Howe, Jr. | 308/236 |
| 3,805,506 | 4/1974 | Stahlecker | 57/105 X |
| 3,807,157 | 4/1974 | Stahlecker | 57/58.89 |
| 3,833,275 | 9/1974 | Wendel | 308/156 |
| 3,838,560 | 10/1974 | Stahlecker | 57/58.89 |
| 3,877,212 | 4/1975 | Canzler | 57/58.89 X |
| 4,070,814 | 1/1978 | Goldammer et al. | 57/105 X |

*Primary Examiner*—John Petrakes
*Attorney, Agent, or Firm*—Daniel M. Rosen

[57] ABSTRACT

The shaft of a spinning rotor is journaled for rotation on pairs of rollers, and is urged against the rollers by a drive belt. The end of the shaft away from the rotor has a taper fitted into a corresponding taper of the central hole of a rolling bearing. The shaft may be held in the bearing by a permanent magnet spaced from the end of the shaft, or by an O-ring engaging grooves in extended portions of this shaft and bearing inner ring.

18 Claims, 2 Drawing Figures

AXIAL GUIDE FOR THE SHAFT OF A SPINNING ROTOR

BACKGROUND OF THE INVENTION

This invention relates to an axial guide for a shaft having spinning rotor mounted on one end thereof wherein the shaft is supported or journaled for rotation on pairs of support rollers, and the shaft is tangentially driven by a belt, and wherein the shaft is pressed against support rollers by the belt.

This type of bearing arrangement is generally known. In prior bearings of this construction, axial forces applied to the shaft of the spinning rotor, are opposed by means of conventional bearings. In such known arrangements, however, a porportionately high abrasion occurs, and as a consequence the bearings rapidly wear out. It is also well-known to provide axial guides in such arrangements for guiding the rotary elements, the guides engaging an annular groove of the rotor shaft. These known arrangements thereby consist of a series of individual components.

The present invention is directed to the production of a simple wear-free axial guide for a spinning rotor shaft or the like journaled by the above technique, wherein a minimum number of parts is employed, and in which the rotor shaft can be easily and simply assembled or disassembled.

SUMMARY OF THE INVENTION

In accordance with the invention, the above objectives are achieved by providing an axial guide including a radial rolling bearing, having a tapered hole, and by providing a corresponding taper on or adjacent the end of the shaft away from the spinning rotor. The rolling bearing is radially yieldably mounted within a housing, by means of a casing. The tapered end of the shaft engages the correspondingly tapered hole of the bearing. In addition, means are provided for releasably axially holding the shaft within the bearing. These holding means can be comprised of a magnet, or by an O-ring serving as a spring acting in a direction to hold the shaft in position.

According to a further feature of the invention, the wall of the casing for receiving the rolling bearing, adjacent the closed end thereof, is provided with recesses on its outer and inner surfaces, the recesses being annular, in order to provide radial yieldability in the casing.

BRIEF DESCRIPTION OF THE DRAWINGS

In order that the invention will be more clearly understood, it will now be disclosed in greater detail with reference to the accompanying drawing, wherein.

DETAILED DESCRIPTION OF THE PREFERRED EMBODIMENTS

Figure 1:
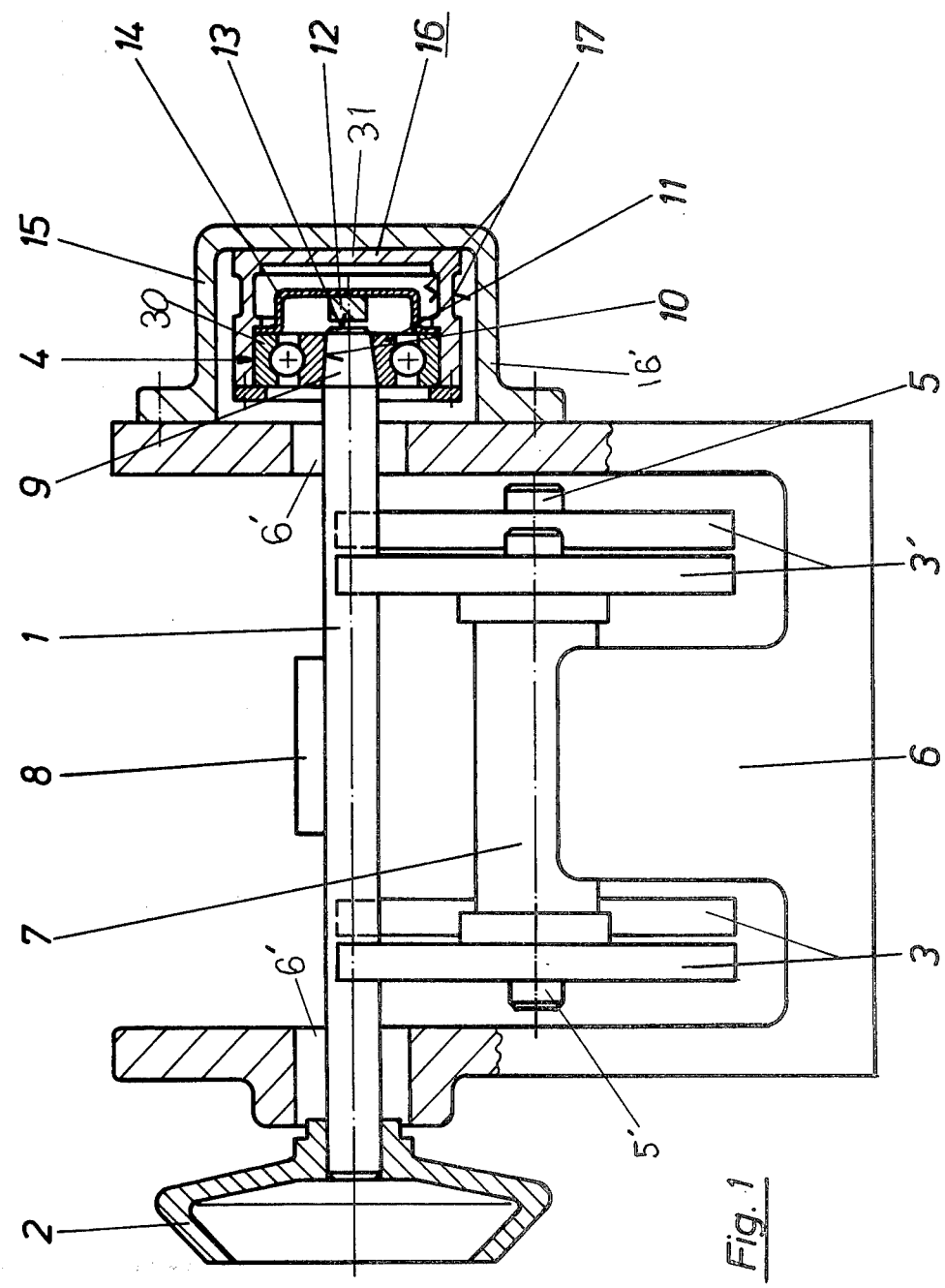
FIG. 1 is a partially cross-sectional view of a spin turbine employing one embodiment of an axial guide in accordance with the invention.

Referring now to FIG. 1, therein is illustrated a spinning apparatus including a shaft 1 having a spin rotor 2 fixedly mounted to one end thereof. The shaft 1 is radially supported on two axially spaced apart support roller pairs 3 and 3'. One support roller of each pair is mounted for rotation on a shaft 5 journaled in housing 7. The other roller of each pair is mounted for rotation on a shaft 5' parallel to the shaft 5 and journaled in a further housing (not shown). The housings are affixed to a bearing block 6. As illustrated in the figure, the bearing block 6 may have a generally U-shaped cross section with aligned holes 6' on opposite sides thereof through which the shaft 1 freely extends, and each of the shafts 5 and 5' rotatably supports a roller from the support pair 3 and a roller from the support pair 3'. The shaft 1 is radially held against the support roller pairs 3, 3' by means of a belt 8, which tangentially engages the shaft, and may serve to rotatably drive the shaft.

The end 9 of the shaft away from the spinning rotor or turbine 2 is provided with a tapered surface, which engages a correspondingly tapered hole 10 of the inner ring 11 of a rolling bearing such as the illustrated radial ball bearing 4. Due to the use of this tapered interconnection, the shaft 1, with its spinning rotor 2, can be easily mounted on the bearing, but the interconnection of the bearing and the shaft does not by itself serve to axially stop the shaft.

In order to axially hold the shaft in the tapered hole 10 of the inner ring, a permanent magnet 12 may be mounted on the bottom of a bowl shaped number 14 affixed to the stationary outer ring 30 of the bearing 4. The inside of the member 14 faces the end 13 of the shaft 1 therein, and the permanent magnet is coaxially arranged with the shaft 1. The magnet 12 is further spaced from the facing end 13 of the shaft 1 by a small distance, so that an axial force is provided on the shaft 1 tending to hold the shaft 1 within the bearing 4.

The bearing 4 and the bowl shaped element 14 affixed thereto are held in position adjacent the corresponding hole 6' of the bearing block 6, by means of a casing 16. This casing may have annular side walls 16' within which the bearing 4 and bowl like element 14 are mounted by conventional means, and a bottom 31. The bottom 31 of the casing 16 is affixed within a flanged housing 15, which in turn may be fixedly mounted, for example, to the bearing block 6. The housing 16 provides a radially acting resilient or spring like suspension while still providing an adequate axial stiffness. For this purpose, the wall strength of the casing 16 may be reduced, for example, by providing recesses 17 in its circumferentially outer surface and/or in the internal cylindrical walls of the casing. The recesses 17 may be annular, as illustrated. As a consequence of provision of these recesses, the casing 16 is radially yieldable, so that relative radial movement between the shaft 1 and the roller pairs can be compensated or equalized.

Figure 2:
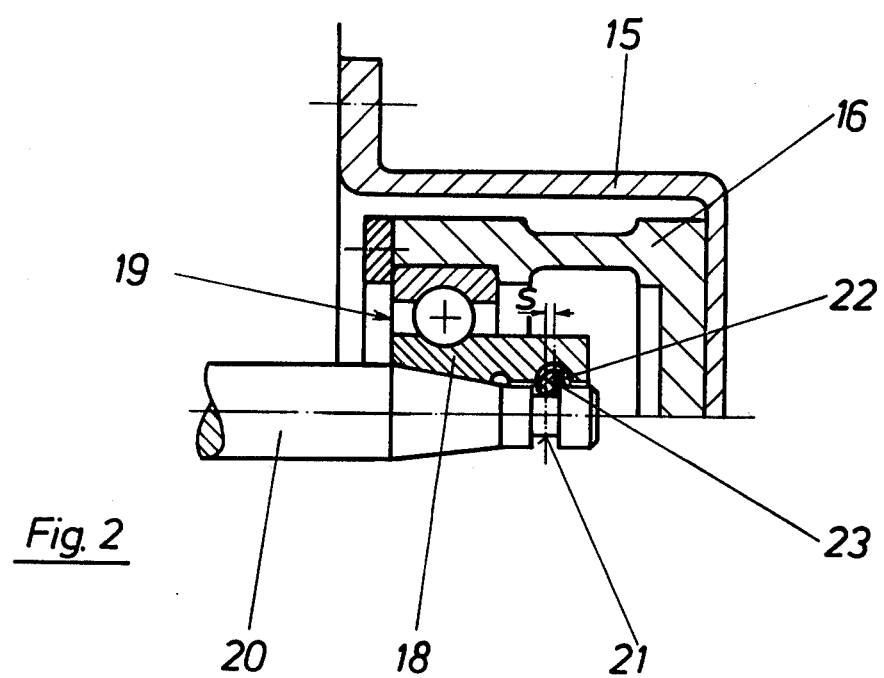
FIG. 2 is an enlarged partially cross-sectional view of a portion of a modification of the arrangement of FIG. 1, showing a further embodiment of the invention.

Referring now to FIG. 2, therein is illustrated a further example of an axial guiding arrangement in accordance with the invention, which differs from the construction of FIG. 1 in that the inner ring 18 of the radial acting ball bearing 19, and the shaft 20 affixed to the spinning rotor, are lengthened on the end thereof away from the spinning rotor (not illustrated in FIG. 2). An annular groove 21 is provided on the lengthened end of the shaft 20, and annular recess 22 is provided in the central hole in the extended end of the inner bearing ring 18, it being apparent that the extended end portion of the shaft is not tapered, and the hole in the corrrespondently extended end of the inner ring 18 is also not tapered. Further, in the embodiment of the invention illustrated in FIG. 2, the holding magnet of the embodiment of the invention illustrated in FIG. 1 is also not provided.

An O-ring 23 is received partially in each of the annular grooves 21 and 22, the O-ring 23 preferably being of a plastic material, and acting to resiliently hold the shaft 20 in the bearing ring 18. For this purpose, the central planes of the grooves 21 and 22, i.e., normal to the bearing axis, as depicted by the dash-dot lines, are axially separated by a distance S, the central plane of the recess 22 being farther from the spinning rotor end of the shaft 20 than the central plane of the recess 21. Further, in the embodiment of the invention illustrated in FIG. 2, the recess 22 has a generally circular cross section and the grooves 21 in the end of the shaft 20 has a generally rectangular cross section. The depth of the groove 22 in the hole of the central of inner ring 18 is preferably between 15 and 20 percent of the diameter of the O-ring 23, while the groove 21 has a cross section sufficiently great that the entire volume of the O-ring 23 may be received therein when the shaft 1 is being inserted or withdrawn from the central hole of the inner bearing ring 18. In this arrangement, in accordance with the invention, the O-ring 23 engages one side of the groove 22 and resiliently urges the shaft 20 into the hole in the bearing.

The space between the bearing 19 and the base of the casing 16 can be used as a lubricant reservoir.

The above described arrangements in accordance with the invention constitute only examples of axial guiding for a shaft of a spinning rotor or the like in accordance with the invention, and it will be apparent that variations and modifications may be made in the construction of the individual components, within the scope of the invention. For example, the deeper groove may be provided, in the embodiment of FIG. 2, in the interior of the hole of the inner ring 18, with the shallower groove of simicircular cross section being provided in the end of the shaft. Further, the angle of the taper on the end of the shafts 1 and 20 can be so selected, that a self-stopping seat in the hole of the inner ring is also ensured in the event of vibrations that may occur, and on the other hand controllable withdrawing forces still are present. In order to hold these withdrawing forces to a minimum, one or both of the tapered surfaces can be provided with a friction minimizing material, such as, for example, a plastic material.

It is therefore intended in the following claims to cover each such variation and modification as follows within the true spirit and scope of the invention.

What is claimed is:

1. In a mounting system for a shaft having a spinning rotor on one end, including support roller pairs and a drive belt tangentially engaging the shaft and urging it radially against said support roller pairs; the improvement wherein a region of said shaft adjacent the other end thereof is tapered, and further comprising a rolling bearing having a central hole with a taper of the same angle as the taper of said shaft, said tapered shaft being inserted in said central hole, and further comprising means for releasably holding said other end of said shaft in said tapered hole.

2. In a mounting system for a shaft having a spinning rotor on one end, including support roller pairs and a drive belt tangentially engaging the shaft and urging it radially against said support roller pairs; the improvement wherein a region of said shaft adjacent the other end thereof is tapered, and further comprising a rolling bearing having a central hole with a taper of the same angle as the taper of said shaft, said tapered shaft being inserted in the said central hole, and further comprising means for releasably holding said other end of said shaft in said tapered hole, said rolling bearing having an inner ring and an outer ring, said tapered hole extending in said inner ring, and further comprising a fixedly mounted flanged housing, and a radially yieldable casing supporting said outer ring in said flanged housing.

3. The mounting system of claim 2 wherein said casing has annular side walls, and annular grooves in the inner and/or outer periphery of said annular side walls.

4. The mounting system of claim 2 wherein said means for releasably axially holding said shaft comprises a permanent magnet spaced a small distance from said other end of said shaft.

5. The mounting system of claim 4 wherein said permanent magnet is mounted in said casing, said casing being bowl shaped.

6. The mounting system of claim 2 wherein said shaft has a cylindrical extension on the end thereof away from said rotor, and said hole in said inner ring has a corresponding cylindrical extension, further comprising annular grooves partially aligned in said extended ends of said shaft and inner bearing ring, and an O-ring positioned in said grooves for urging said shaft in said tapered hole.

7. The mounting system of claim 6 wherein the central planes of said annular grooves extending transversely of the axis of said shaft are axially spaced apart.

8. The mounting system of claim 6 wherein one of said grooves has a circular cross section and the opposite lying groove has a rectangular cross section.

9. The mounting system of claim 8 wherein the depth of said groove with a circular cross section is from about 15 to 20 percent of the diameter of the cross section of said O-ring.

10. The mounting system of claim 8 wherein the cross sectional area of said rectangular groove is at least as great as the cross sectional area of said O-ring, whereby said O-ring may be held entirely within said rectangular cross section groove upon assembly and disassembly of said shaft in said inner ring.

11. The mounting system of claim 2 wherein the tapered surfaces of at least one of said shaft and inner bearing ring comprises a friction minimizing layer.

12. The mounting system of claim 11 wherein said layer is of a plastic material.

13. A guide for the tapered end of a shaft, comprising a rolling bearing having inner and outer rings separated by rolling elements, said bearing having a tapered central hole within which said tapered end of said shaft is inserted, and further comprising a flanged housing surrounding said outer ring, a bowl shaped casing having its bottom mounted on the bottom of said flanged housing and side walls supporting said outer ring, the side walls of said bowl shaped casing being radially yieldable, and further comprising means for releasably holding the tapered portion of said shaft axially in engagement with the corresponding tapered portion of said inner hole.

14. The mounting system of claim 1 wherein said means for releasably holding said other end of said shaft comprises releasable means mounted adjacent said other end of said shaft.

15. The mounting system of claim 1 wherein said means for releasably holding said other end of said shaft comprises magnetic means mounted adjacent said other end of said shaft.

16. The mounting system of claim 1 wherein said means for releasably holding said other end of said shaft comprises resilient means engaging said shaft and positioned to releasably hold said shaft in said inner ring.

17. The mounting system of claim 16 wherein said resilient means comprises an O ring positioned in aligned grooves in said inner ring of said shaft.

18. The mounting system of claim 1 wherein said means for releasably holding said other end of said shaft comprises means urging the tapered portion of said shaft in said central hole while enabling removal thereof by axially directed forces on said shaft.

* * * * *